April 18, 1933.  C. A. RICH  1,904,329
STOCK GUIDE MEANS FOR MACHINE TOOLS
Filed July 1, 1931
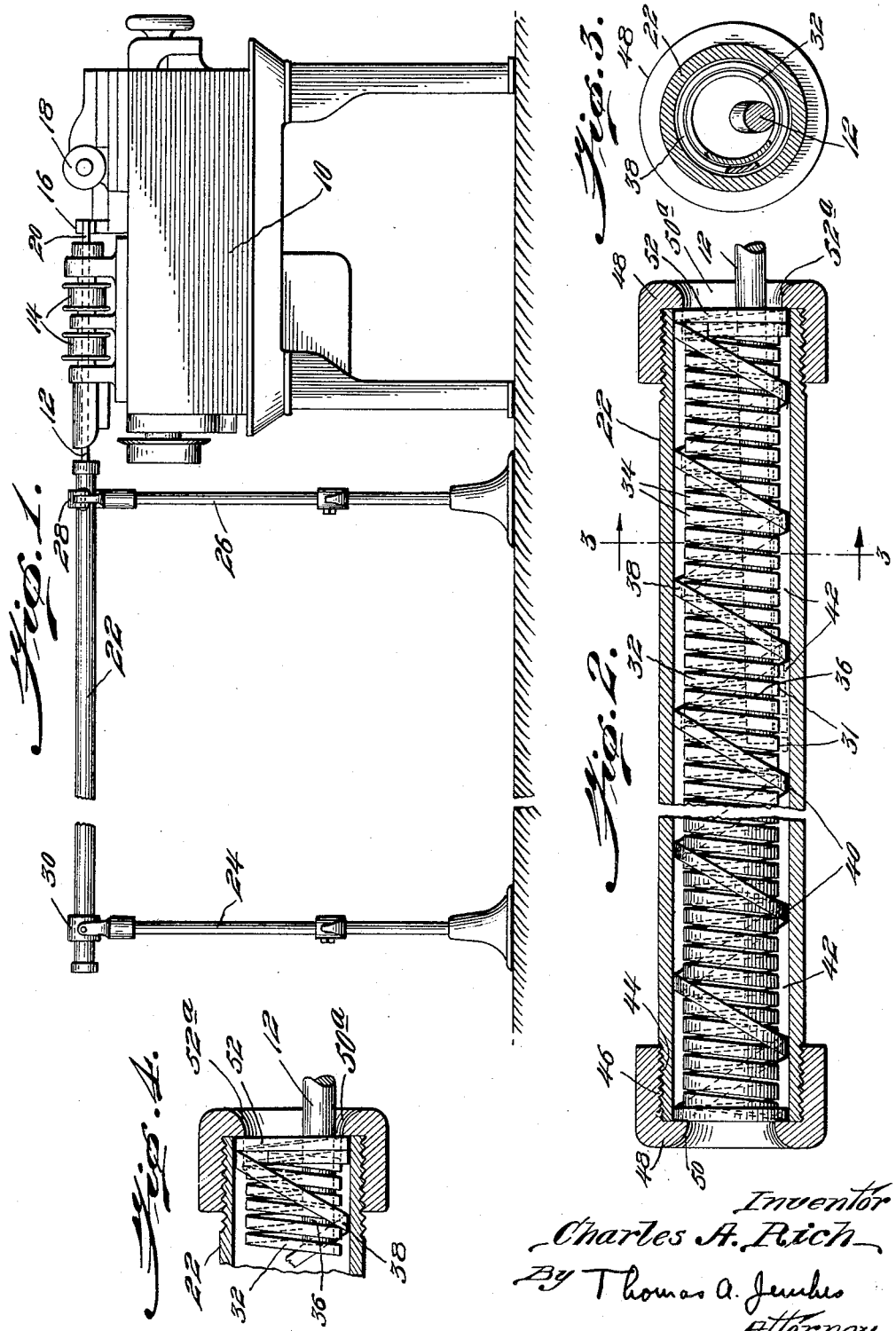
Inventor
Charles A. Rich
By Thomas A. Jenkins
Attorney Patented Apr. 18, 1933

1,904,329

UNITED STATES PATENT OFFICE

CHARLES A. RICH, OF PROVIDENCE, RHODE ISLAND, ASSIGNOR TO BROWN & SHARPE MFG. CO., OF PROVIDENCE, RHODE ISLAND, A CORPORATION OF RHODE ISLAND

STOCK GUIDE MEANS FOR MACHINE TOOLS

Application filed July 1, 1931. Serial No. 548,170.

My invention relates to improvements in guide means for feeding bars of stock to a machine tool, such as a lathe or an automatic screw machine.

An object of my invention is to provide a guide means which will substantially lessen a large amount of the noise which now takes place in these tubes caused by the rotating bars forcibly striking against the side of the tube, thereby providing better efficiency in the worker by the substantial lessening of the noise attendant in such machines. When bars of stock have been fed in guide tubes of this description particularly if they happen to be of square, hexagonal, or other shape, they tend to strike as they rotate therein against the side of the tubes and become scratched. A further object of my invention therefore is to provide a specific type of yielding cushioning lining which in addition to the substantial elimination of noise will substantially eliminate this knocking or striking. While I am aware that others have provided various types of devices for these purposes, I believe that I am the first to provide in a guide tube of usual type a bar supporting lining for said tube having freely flexible side walls and means independent of said lining interposed between said lining and the inner wall of said tube for supporting said lining at spaced points along said tube, whereby the side wall of said lining may freely flex outwardly within said tube between the portions of support of said supporting means. As I provide a lining which is at all times substantially in contact with the end or other portion of the rotating stock bar, it is obvious that substantially no noise will take place between the point of contact of the lining and the bar. As I also provide supporting means independent of the lining at spaced intervals along the tube, it is obvious that the side walls of the lining may freely flex outwardly intermediate said points of support and thus wear out the energy of the rotating bar by noiselessly pressing out the flexible side walls of the lining without causing noise or marring by coming in contact with any sharp substance, such as the inner walls of the tubes themselves.

In the preferred embodiment of my invention I preferably employ as the lining a flexible spring in which the adjacent coils thereof are freely flexible outwards and which also as they are resilient will readily return without noise to their original positions as soon as the centrifugal force of the contacting stock is stopped by the inertia of said lining. While any means for supporting the flexible lining at spaced intervals along the tube may be employed I preferably employ as said means a supplemental sheath spring in which the coils thereof are spaced apart a substantial distance so as to permit a plurality of the coils of the lining or supporting spring to readily flex in the space between the adjacent coils of the outer sheath spring.

A further object of my invention is to provide means to secure said lining and supporting means within said tube against longitudinal movement. Said means preferably comprises cap members for each end of said tube. The cap at the end thereof adjacent said machine has a hole for the withdrawal of stock therefrom a diameter of such that the edges of the hole will abut the supporting means and/or lining exterior of the inner periphery of the lining so that the bar of stock may rest on the walls of the resilient lining and thus be subjected to no shock or striking against the edges of the hole in the cap member or the supporting means for the lining.

These and such other objects of my invention as may hereinafter appear will be best understood from a description of the accompanying drawing which illustrate my invention attached to a screw machine.

In the drawing, Fig. 1 is a side elevation of my invention attached to a screw machine.

Fig. 2 is a longitudinal sectional view of the guide tube I preferably employ showing the inner spring lining and the outer sheath supporting spring and an end of a rotating bar of stock therein in elevation.

Fig. 3 is a sectional view taken along the line 3—3 of Fig. 2.

Fig. 4 is a sectional view of an end of the tube generally similar to Fig. 2 showing how even when the bar of stock lies horizontally within the guide tube it abuts the inner periphery of the inner supporting spring only.

In the drawing, wherein like characters of reference indicate like parts throughout, I have shown my invention applied to a screw machine 10 of standard type. In machines of this description the work 12 in stock or bars is fed through the rotating work holder 14 and projects through the inner end thereof where the various tools 16 suitably controlled by the index mechanism 18 may be brought to bear upon the projecting end 20 of said rotating work bar of stock. Inasmuch as lathes or screw machines of this description work automatically for quite a time it has been necessary in the art to provide some sort of means to supply a length of stock for them to work on during such a time and it has been customary in the prior art to provide the guide tube 22 of considerable length adapted to receive a rotating bar of stock or wire 12 and permit it to be worked on with various parts of the screw machine 10 and it has only been necessary for the operative to replace the rotating bar of stock 12 at stated spaced intervals when the machine becomes empty of stock. It is apparent, however, that as the stock 12 which may be round as shown, square, hexagonal, rectangular or otherwise revolves in the stationary tube 22 that it will rattle therein and the sides and end thereof will tend to vibrate and strike against the inner side of the tube 22, thereby causing a large amount of noise, and tending to break, chip or mar the corners of any irregularly shaped stock.

My invention particularly relates to the substantial lessening of this noise and chipping. The tube 22 may be supported in any manner such as by means of the rear supporting rod 24 and the front supporting rod 26 which may be adjustable in height and which are preferably so made that the outer rod 26 will have a head 28 comprising jaws which may be spaced apart for the lateral removal of the tube 22 therefrom and that the rear supporting rod may have a head 30 universally supported so as to permit pivoting thereof when it is desired to move the end of the tube 22 nearest the screw machine 10 for the insertion of another bar of wire or stock therein.

To the end of providing a type of guiding means which will substantially lessen all the noise caused by the rotating stock and consequent chipping thereof, which of itself will not wear out and which provides a readily fabricated and cheap structure to accomplish these purposes, I preferably provide a bar supporting lining 32 for said tube having a freely flexible resilient side wall. In my preferred embodiment my preferred bar supporting lining comprises a helically wound bar supporting resilient strip preferably constructed of sheet metal so as to substantially form a spring within said tube and preferably having spaced coils 34 so that the individual coils 34 may freely flex outwardly relatively to each other. It is necessary, however, in order to substantially eliminate the noise to provide means to permit the sides 31 of the lining 32 to flex outwardly as successive parts thereof are abutted by the end 36 or side of the rotating stock 12. For this purpose I provide means 38 independent of said lining interposed between said lining and the inner wall of said tube 22 for supporting said lining at spaced points 40 along said tube whereby the side wall of said lining may freely resiliently flex outwardly within said tube between the points of support of said supporting means and thus cause the resiliency of the inner spring or resilient lining itself to take up the shocks caused by the rotating end or sides of the work 12 and as the side walls of the coils 34 will individually stretch within the spaces 42 between the points of support 40 it is obvious that the energy caused by the rotating end 36 or side of said work will be completely absorbed by the resilient inertia of the spring itself without causing a sharp contact against the side wall of the tube 22. While any type of means 38 may be employed to support said lining 32 at spaced points 40 along said tube, I preferably employ for this purpose the flat helically wound sheath strip interposed between said supporting strip 32 and the inner wall of said tube having the coils 40 spaced apart a greater distance than the coils 34 of the resilient supporting strip 32, whereby the coils 34 of said supporting spring or strip 32 contacting the bar 36 may freely resiliently flex outwardly within said tube in the spaces 42 between the more widely spaced coils 40 of said sheath strip 38 as shown more particularly in Fig. 2.

I also provide means for securing said lining 32 and supporting means 38 within said tube against longitudinal movement. In my preferred embodiment for this purpose I preferably exteriorly thread the ends of the tube 22 as at 44 and I provide cap members having internally threaded side walls 46 which may be readily threaded on to the threaded ends 44 of the tube having end walls 48 extending annularly inwardly towards the center of said cap members a sufficient amount to abut the ends of the lining or helical supporting spring 32 and the ends of the spaced supporting sheath spring 38 to secure said members 32 and 38 against longitudinal vibration within said tube. I provide the ends of the cap members with the central holes 50 of such a size as to permit insertion therein of different size bars of stock, namely, one $1/8''$, $1''$, $2''$, etc. In order that the stock may be resiliently supported near the machine end of the guide tube, I preferably form the hole $50^a$ in the cap member 48 adjacent the machine end of the guide tube so that it may extend exterior of the inner periphery of said bar supporting and sheath strips to permit the projecting end of the stock bar to rest on the inner lining itself and not strike against the supporting means or sheath strip or the edges of the hole 50ª in said cap member 48 as shown in Fig. 4. To this end I preferably enlarge the end coil 52 of the supporting spring or strip 32 adjacent the machine edge to the approximate diameter of the supporting means or sheath strip 38 and provide the central hole 50ª in the cap member adjacent said end of such a size to abut the enlarged outer end coil 52 of said supporting strip or lining 32 to permit the bar end to resiliently rest on the inner coils of said supporting strip 32 without contacting any portion of the supporting means 38 or the edge of the hole 52ª in the cap member 48 as shown in Fig. 4. It is thus obvious that with the improved means I employ I am enabled to have the shock and noise caused by the end and sides of the rotating rod translated into vibration of a freely vibratory and resilient member with the substantial elimination of any objectionable noise, and inasmuch as the coils 34 of the lining 32 are resilient it is also apparent that they will freely give instead of forming a sharp contact with the rotating stock.

It is understood that my invention is not limited to the specific embodiment shown and that various deviations may be made therefrom without departing from the spirit and scope of the appended claims.

What I claim is:

1. Guide means for feeding bars of stock to machine tools, including a tube, a helically wound bar supporting resilient strip within said tube having spaced coils, a flat helically wound sheath strip interposed between said supporting strip and the inner wall of said tube having coils spaced apart a greater distance than those of the resilient supporting strip whereby the coils of said supporting strip contacting said bar may freely resiliently flex outwardly within said tube between the more widely spaced coils of said sheath strip, and cap members secured to the ends of said tube having end walls abutting the ends of said strips to secure them against longitudinal vibration having central holes therein extending exterior of the inner periphery of said bar supporting and sheath strips of a size to permit insertion of different sized bars of stock.

2. Guide means for feeding bars of stock to machine tools, including a tube, a flat helically wound bar supporting spring within said tube having spaced coils, a flat helically wound sheath spring interposed between said supporting spring and the inner wall of said tube having coils spaced apart a greater distance than those of the resilient supporting spring whereby the coils of said supporting spring contacting said bar may freely resiliently flex outwardly within said tube between the more widely spaced coils of said sheath spring, and cap members secured to the ends of said tube having end walls abutting the ends of said springs to secure them against longitudinal vibration having central holes therein of a size to permit insertion of different sized bars of stock.

3. Guide means for feeding bars of stock to machine tools, including a tube, a helically wound bar supporting resilient strip within said tube, a helically wound sheath strip interposed between said supporting strip and the inner wall of said tube having coils spaced apart a substantial distance whereby the coils of said supporting strip contacting said bar may freely resiliently flex outwardly within said tube between the spaced coils of said sheaf strip, and cap members secured to the ends of said tube having end walls abutting the ends of said strips to secure them against longitudinal vibration having central holes therein of a size to permit insertion of different sized bars of stock.

4. Guide means for feeding bars of stock to machine tools, including a tube, a helically wound bar supporting spring within said tube, a helically wound sheath spring interposed between said supporting spring and the inner wall of said tube having coils spaced apart a substantial distance whereby the coils of said supporting spring contacting said bar may freely resiliently flex outwardly within said tube between the spaced coils of said sheath spring, and cap members secured to the ends of said tube having end walls abutting the ends of said springs to secure them against longitudinal vibration having central holes therein of a size to permit insertion of different sized bars of stock.

5. Guide means for feeding bars of stock to machine tools, including a tube, a helically wound bar supporting spring within said tube, a helically wound sheath spring interposed between said supporting spring, and the inner wall of said tube having coils spaced apart a substantial distance whereby the coils of said supporting spring contacting said bar may freely resiliently flex outwardly within said tube between the spaced coils of said sheath spring, and cap members secured to the ends of said tube having end walls abutting the ends of said springs to secure them against longitudinal vibration having central holes therein extending exterior of the inner periphery of said bar supporting and sheath springs of a size to permit insertion of different sized bars of stock.

6. Guide means for feeding bars of stock to machine tools, including a tube, a helically wound bar supporting resilient strip within said tube having spaced coils, a helically wound sheath strip interposed between said supporting strip and the inner wall of said tube having coils spaced apart a greater distance than those of the resilient supporting strip whereby the coils of said supporting strip contacting said bar may freely resiliently flex outwardly within said tube between the more widely spaced coils of said sheath strip.

7. Guide means for feeding bars of stock to machine tools, including a tube, a helically wound bar supporting spring within said tube having spaced coils, a helically wound sheath spring interposed between said supporting spring and the inner wall of said tube having coils spaced apart a substantial distance whereby the coils of said supporting spring contacting said bar may freely resiliently flex outwardly within said tube between the more widely spaced coils of said sheath spring.

8. Guide means for feeding bars of stock to machine tools, including a guide tube, a bar supporting lining for said tube having a freely flexible resilient side wall, means independent of said lining interposed between said lining and the inner wall of said tube for supporting said lining at spaced points along said tube only whereby the side walls of said lining may freely resiliently flex outwardly within said tube between the points of support of said supporting means, and means for securing said lining and supporting means within said tube against longitudinal movement.

9. Guide means for feeding bars of stock to machine tools, including a guide tube, a bar supporting lining for said tube having a freely flexible resilient side wall, and means independent of said lining interposed between said lining and the inner wall of said tube for supporting said lining at spaced points along said tube only whereby the side wall of said lining may freely resiliently flex outwardly within said tube between the points of support of said supporting means.

10. Guide means for feeding bars of stock to machine tools, including a guide tube, a helical bar supporting spring within said tube, means independent of said spring interposed between said spring and the inner wall of said tube for supporting said spring at spaced points along said tube only, whereby individual coils of said spring may freely flex outwardly within said tube between the points of support of said supporting means, and means for securing said spring and supporting means within said tube against longitudinal movement.

11. Guide means for feeding bars of stock to machine tools, including a guide tube, a helical bar supporting spring within said tube, means independent of said spring interposed between said spring and the inner wall of said tube for supporting said spring at spaced points along said tube only, whereby individual coils of said spring may freely flex outwardly within said tube between the points of support of said supporting means.

12. Guide means for feeding bars of stock to machine tools, including a tube, a helically wound bar supporting resilient strip within said tube having spaced coils, a flat helically wound sheath strip interposed between said supporting strip and the inner wall of said tube having coils spaced apart a greater distance than those of the resilient supporting strip whereby the coils of said supporting strip contacting said bar may freely resiliently flex outwardly within said tube between the more widely spaced coils of said sheath strip, and cap members secured to the ends of said tube having end walls abutting the ends of said strips to secure them against longitudinal vibration having central holes therein, the end coil of the supporting strip adjacent the machine end of said tube being enlarged to the approximate diameter of the sheath strip beyond the sheath strip and the central hole in the cap member adjacent said end being of a size to abut the enlarged outer edged coil of the supporting strip to permit the bar end to resiliently rest on the supporting strip.

13. Guide means for feeding bars of stock to machine tools, including a tube, a helically wound bar supporting spring within said tube, a helically wound sheath spring interposed between said supporting spring and the inner wall of said tube having coils spaced apart a substantial distance whereby the coils of said supporting spring contacting said bar may freely resiliently flex outwardly within said tube between the spaced coils of said sheath spring, and cap members secured to the ends of said tube having end walls abutting the ends of said springs to secure them against longitudinal vibration having central holes therein of a size to permit insertion of different sized bars of stock, the end coil of the supporting spring adjacent the machine end of said tube being enlarged to the approximate diameter of the sheath spring beyond the sheath spring and the central hole in the cap member adjacent said end being of a size to abut the enlarged outer edge coil of the supporting spring to permit the bar end to resiliently rest on the supporting spring.

14. Guide means for feeding bars of stock to machine tools, comprising a tube, a plurality of helically wound bar supporting members within said tube, one of said members being adapted to be in contact with the bar of stock and another of said members lying between said inner bar contacting member and the inner surface of the tube.

In testimony whereof I affix my signature.

CHARLES A. RICH.